United States Patent [19]

Guerra

[11] Patent Number: 4,673,818
[45] Date of Patent: Jun. 16, 1987

[54] ROUGHNESS MEASURING APPARATUS

[75] Inventor: John M. Guerra, Concord, Mass.

[73] Assignee: Polaroid Corporation, Cambridge, Mass.

[21] Appl. No.: 801,402

[22] Filed: Nov. 25, 1985

[51] Int. Cl.$^4$ ............................................... G01B 9/00
[52] U.S. Cl. .................................... 250/571; 250/228; 356/124
[58] Field of Search ............... 250/571, 228; 356/124, 356/236

[56] References Cited

U.S. PATENT DOCUMENTS

| | | | |
|---|---|---|---|
| 2,171,433 | 8/1939 | Powers | 73/51 |
| 2,363,700 | 11/1944 | Soetbeer | 88/24 |
| 3,277,773 | 10/1966 | White | 88/14 |
| 3,545,871 | 12/1970 | Waska | 356/236 |
| 3,947,127 | 3/1976 | Bennett et al. | 356/124 |
| 3,971,956 | 7/1976 | Jakeman et al. | 250/571 |
| 4,364,663 | 12/1982 | Gardner et al. | 356/371 |
| 4,626,101 | 12/1986 | Ogawa et al. | 356/236 |

OTHER PUBLICATIONS

Description of Model 201 Portable Scatterometer by Talandic Research Corp.

Primary Examiner—Eugene R. LaRoche
Assistant Examiner—David Mis
Attorney, Agent, or Firm—Francis J. Caufield

[57] ABSTRACT

A surface roughness measuring apparatus employing a molded Coblentz Sphere and a pair of matched photovoltaic sensors of wafer-thin rectangular configuration to allow the sensor used to detect specular reflection, to be used also as a reflector for directing a sample orienting beam to a screen and to avoid intrusion of the sensor used to detect scatter light into the sphere. The apparatus is contained in a console having an unobstructed top surface on which a sample may be placed. Also, a remote sample mounted sensing head may be attached to the console for use with large samples.

23 Claims, 8 Drawing Figures

ROUGHNESS MEASURING APPARATUS

BACKGROUND OF THE INVENTION

This invention relates to apparatus for measuring surface roughness and, more particularly, it concerns improvements in apparatus employing the "total integrated scatter" method of measuring surface roughness.

Manufacturers of equipment requiring precision surfaces such as calendering rolls and optical equipment including lenses, mirrors and the like, are increasingly called upon to characterized the predicted performance capabilities of their products in terms of specified microroughness. While a wide variety of techniques are known for measuring and quantifying microroughness in the range of from 100 Å RMS to less than 10 Å RMS, presently available equipment capable of reliable applying the known roughness measuring technology suffers from such disadvantages as being excessively expensive, difficult to use, and/or time consuming in operation.

Of the many available methods for providing an indication of microroughness, the Total Integrated Scatter of T.I.S. method of surface evaluation has substantial potential for incorporation in equipment which does not suffer from the aforementioned disadvantages. In the T.I.S. method, the surface of a test sample is placed at one off-axis focus of an interiorly polished hemisphere, such as a Coblentz Sphere, and illuminated at normal incidence with an HE-NE laser entering an aperture at or near the apex of the hemisphere. As a result of the normal or near normal incidence of the laser illumination, specularly reflected laser light exits through the same aperture whereas all laser light scattered by roughness of the same surface (excepting only that light which exits through the apex aperture) is focused at the conjugate focus of the hemisphere. Surface roughness of the sample can be quantifified by the different intensities of the specularly reflected light and the focused scattered light in accordance with the equation:

$$h_{RMS}(\text{Å}) = (6328\text{Å}/4\pi)((V_d/V_{RS})(r_{RS}/r_S))^{\frac{1}{2}}$$

where $V_d$ is a signal corresponding to the intensity of scattered light, $V_{RS}$ is a reference scatter signal, $r_{RS}$ is the reference specular signal, and $r_S$ is a signal corresponding to the intensity of specular light reflected from the sample.

While the T.I.S. method provides good relative measurements of surface microroughness in the context of sensitivity, providing a single number for specification and avoiding physical contact with a sample surface, several problems are presented to the provision of a low-cost, effective apparatus for its practice. For example, because a hemisphere has only one true focal point (i.e., its center), it is not possible to locate both a sample surface and a detector simultaneously at that true focal point. As a result, one or both of the sample and detector or sensor must be located off the true focal point, in turn resulting in laser light scattered from the sample being not focused at a point by the interior hemispheric reflective surface, but rather at an area which may be an order of magnitude larger than the sample illuminating laser beam. The size of the area of scatter light focus is further enlarged by imperfections in the internal hemispheric reflective surface. Accordingly, signficant increments of costs have been attributed in prior apparatus to scatter light detection devices and to the quality of the hemispheric reflective surface.

Another challenge to apparatus for practicing the T.I.S. method of surface roughness measurement is the requirement that the sensors for measuring specular reflection and scatter focus be matched for the full range of surface roughness to be measured. This challenge has been met in the past by using the same sensor to measure both values of light intensity consecutively. Because the single sensor must be manipulated for each measurement, the measurement procedure is made time consuming and tedious to a point where accuracy may be compromised. In addition, the physical presence of the sensor structure within the hemisphere can block some of the scatter light passing from the sample to the interior hemispheric reflective surface. Since the direction of scatter light eminating from the sample may vary without change in the total amount of scatter, any interference with scatter light reaching the interior hemispheric reflector will result in a potential inaccuracy of the roughness measurement.

In light of the foregoing, it will be apparent that while the methodology for accurate measurement of surface microroughness is presently available, there is a need for improvement in apparatus for practicing the art.

SUMMARY OF THE PRESENT INVENTION

In accordance with the present invention, the problems heretofore encountered with apparatus for practicing the T.I.S. method of measuring surface microroughness are substantially overcome by a self-contained measuring apparatus employing a Coblentz Sphere of an optical quality attainable by molding in combination with a pair of matched photovoltaic sensors and a highly sensitive meter to measure the relative intensities of specular and scatter light reflected from a sample as relative electrical energy on the meter. The sensors are both characterized physically as wafer-thin rectangles which present a relatively large target area to the reflected light to be quantified. Thus, a substantial dispersion of scatter light focused by the low-cost Coblentz Sphere is accommodated by the relatively large target area of the scatter light sensor. Also the thin or relatively flat configuration of the sensors enables the scatter light sensor to be located within the sphere near the focal point thereof without the sensor, in itself, interfering with passage of scatter light from the sample surface to all portions of the Coblentz Sphere interior. The planar configuration of the sensors also enables the specular sensor to double as a reflector of specular light from the sample to an alignment screen for assuring proper sample orientation.

Broadly, the apparatus includes a hemispheric reflecting surface having means for positioning the sample surface to be measured close to the equatorial plane, an aperture located in the hemisphere for transmitting a beam of light into the hemisphere and to the sample for reflection of specular light therefrom back through the aperture, and a wafer-thin light-responsive cell located close to the equatorial plane for providing a signal responsive to the scatter light from the sample which is focused by the reflecting surface. Preferably, the sample is supported on the outer surface of a wall provided at the equatorial plane with the wafer-thin cell mounted within or on the interior surface of the wall to provide an unobstructed area of support for the sample while providing minimum intrusion into the hemisphere and minimum interference with the scattered light.

In a preferred embodiment of the invention, the roughness measuring apparatus is contained essentially within a console having a flat top surface on which a sample to be measured may be placed and supported in alignment with a sample port or opening. The Coblentz Sphere, which is physically manifested as an internally reflective hemisphere, is suspended from the console top to be aligned with the sample port. A laser, driven by a power supply unit in the console, is arranged to direct a beam of light through an off-axis port in the Coblentz Sphere in a manner so that specular reflection of the beam from the sample exits the same off-axis port to be reflected from a reflective surface of the photovoltaic specular sensor to an alignment screen presented at the front of the console. The matched scatter light sensor is mounted under the top wall of the console adjacent the sample port to be located at the focal point of the Coblentz Sphere.

The two sensors are connected electrically to a microvolt meter through a switching unit so that separate meter readings of specular and scatter light may be read by the same meter. The console supports a computer/printer unit which may be fed electrically or manually with the respective electrical energy measurements corresponding to specular and scatter light reflected from the sample. The roughness of the sample is calculated by the computer in accordance with the aforementioned equation and printed on a record together with sample identifying data, operator identification data and the like. In this latter respect, the computer preferably functions as a control for the laser power source so that the laser may be actuated only in response to a coded computer output. Also, the computer may override a control circuit for closing a shutter over the sample port to prevent passage of the laser beam through the sample port when no sample is in place.

To accommodate large samples which cannot be located physically on the console, the apparatus includes a remote sensor head adapted for connection to the console but positionable on the surface of a large sample to be measured. While the remote head includes an additional Coblentz Sphere and an additional pair of matched sensors, optical fibers are employed to transmit the output of the console-mounted laser to the remote head and also so that the electrical energy developed by the sensors may be read by the console-mounted meter.

A principal object of the present invention, therefore, is the provision of an inexpensive, self-contained apparatus by which surface roughness measurements of a sample may be measured expeditiously. Another object of the invention is the provision of such an apparatus having a highly effective and yet inexpensive assembly of sensors for obtaining voltage signals corresponding accurately to the respective amounts of specular and scatter light reflected from the surface of a sample to be measured. Other objects and further scope of applicability will become apparent from the detailed description to follow taken in conjunction with the accompanying drawings in which like parts are designated by like reference numerals.

DETAILED DESCRIPTION OF THE PREFERRED EMBODIMENT

Figure 1:
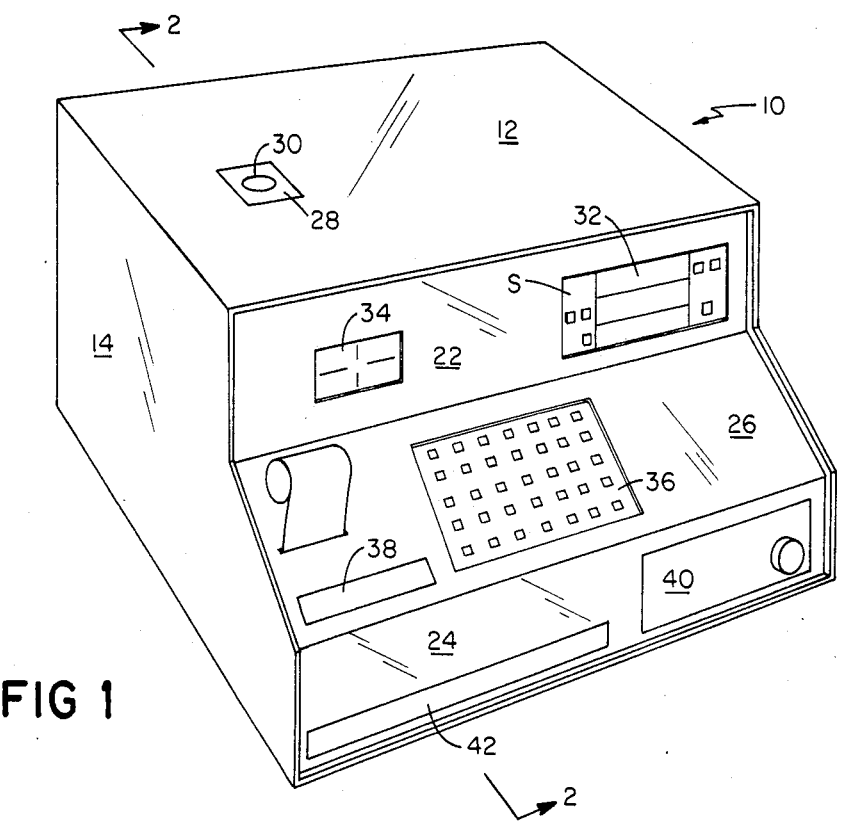
FIG. 1 is a perspective view illustrating the console of containing the apparatus of the present invention.
Figure 2:
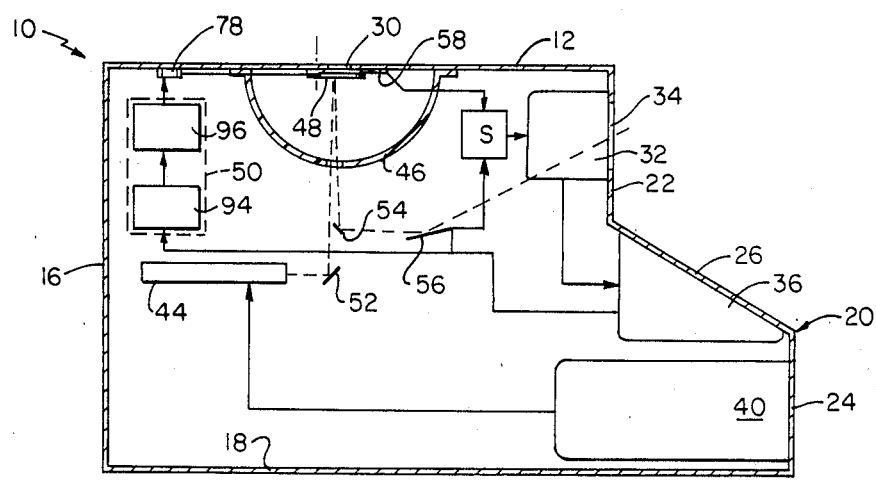
FIG. 2 is a partially schematic fore/aft cross section illustrating interior components of the apparatus shown in FIG. 1.

In FIGS. 1 and 2 of the drawings, the general organization of a preferred embodiment of the present invention is shown to include a console 10 having an outer shell or housing defined by a top wall 12, end walls 14, a back wall 16, a bottom wall 18 and a stepped front wall 20 defining upper and lower front panels 22 and 24, respectively, joined by an inclined keyboard panel 26. A removable adapter plate 28, having a sample port 30, is mounted in the top wall 12 whereas all other operator read and/or manipulated components are presented at the front wall 20. As illustrated in FIG. 1, these latter components include a meter 32, a double pole, double throw switch S, a sample centering screen 34, a computer 36 represented in FIG. 1 by a keyboard, a computer printer 38, a laser power supply unit 40 and an accessory drawer 42.

In FIG. 2, the components presented on the front wall 20 are related schematically to other components within the console 10, such other components including a laser 44, preferably a He-Ne laser, a Coblentz Sphere 46 supported from the top wall 12, a sample port shutter 48 and a shutter control circuit 50. A laser beam folding mirror 52 is supported within the console 10 for directing the discharge of the laser 44 to the sample port 30. A similar mirror 54 redirects specular light reflected from the sample (not shown in FIG. 2) to a specular sensor 56. A scatter light sensor 58 is mounted under the top surface 12 adjacent to the sample port 30. A more complete understanding of the components identified with reference to FIGS. 1 and 2 will become apparent from the detailed description to follow in which reference will be made again to FIGS. 1 and 2 for a full understanding of intended use and operation of the apparatus of the invention.

Figure 3:
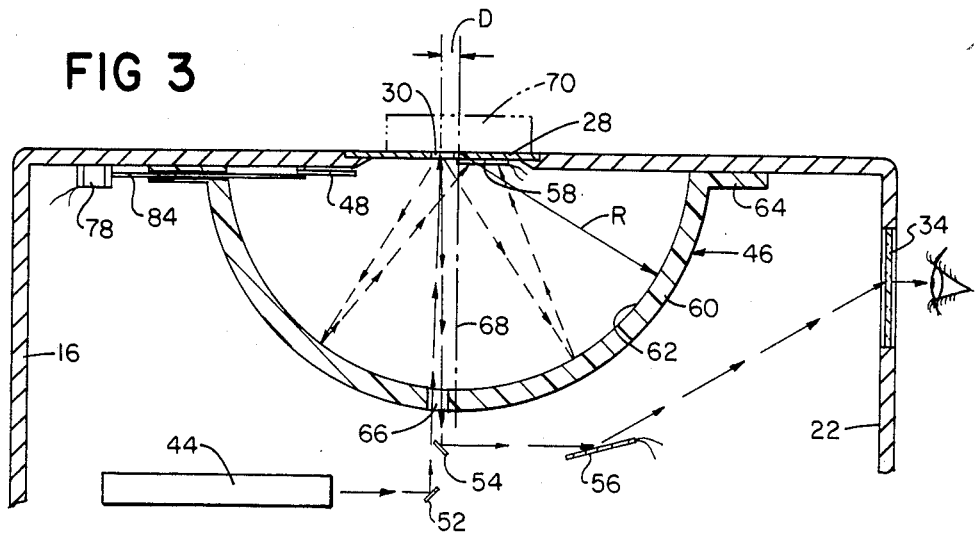
FIG. 3 is an enlarged fragmentary cross section similar to FIG. 2 but illustrating more detail.
Figure 4:
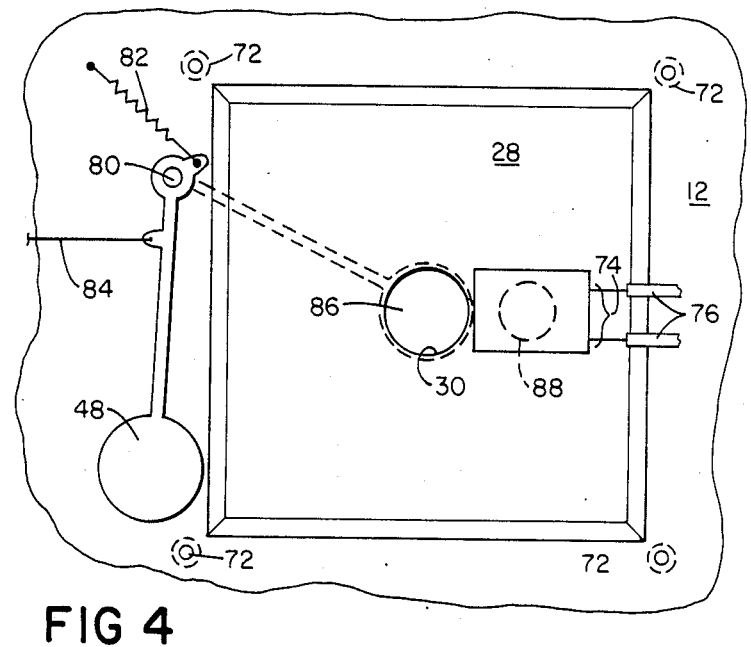
FIG. 4 is an enlarged fragmentary plan view of apparatus shown in FIG. 3.

In FIGS. 3 and 4, optical and electro-optical components previously identified are illustrated more clearly at a larger scale. The Coblentz Sphere 46 is structurally constituted by a hemispheric shell 60 having a totally reflective interior surface 62 of a radius R about a spherical center in the equatorial plane of the hemisphere through which the polar axis 68 of the shell extends. The interior reflective surface of a Coblentz Sphere is traditionally formed with optical precision in a relatively massive body capable of ensuring that precision to a degree that a point source of light at the spherical center is focused by the hemispherical reflective surface back to the same point. In accordance with the present invention, the shell 60 is a molding of synthetic resonous material, such as acrylic, aluminized to provide the reflective surface 62. The molded shell 60 is further formed with a peripheral flange 64 to facilitate securement of the shell 60 to the underside of the top wall 12 of the console by bolts, adhesives or other suitable means (not shown).

The hemispheric shell 60 has a laser beam port 66 which is displaced from the polar axis 68 of the shell 60 by a distance approximating the dimension D. As a result of this slight displacement from the polar axis, specular light reflected from the bottom surface of a samole 70 placed on the sample port 30 will exit through this beam port 66. The slight angle of reflection from the bottom surface of the sample 70 and resulting separation of the laser beam from the reflected specular light at the port 66 enables the specular light to be reflected by a mirror, in this instance, the mirror 54, which is separate from the optics directing the laser beam initially through the port 66. This separation of the optics for the input beam and the exiting specular reflection assures a clear and confined specular beam and facilitates measurement of its intensity.

The specular beam exiting the port 66 is reflected by the mirror 54 to the specular sensor 56 for detection of the specular intensity in a manner to be described. In addition, the specular beam of laser light is reflected by the upper planar surface on the sensor 56 to the alignment screen 34 on the front wall panel 22 of the console 10. Thus, by observing the screen 34, the operator may adjust the orientation of the sample 70, using props or shims so that the specular beam reflected from the sensor 56 is positioned centrally on the screen 34. Also, it will be appreciated that to serve the function of directing the alignment beam to the screen 34, the target area presented by the sensor 56 must be adequately large to intercept the specular beam reflected from the mirror 54 to accommodate at least a limited range of sample misorientation. In this way, final alignment is facilitated.

To measure the intensity of scatter light reflected from the bottom surface of the sample 70 placed over the sample port 30 in accordance with the T.I.S. method, the scatter sensor 58 is located as close to the sample port as possible but on the opposite side of the polar axis 68 from the sample port. Such scatter light is focused on the sensor 58 by the interior reflective surface 62 on the hemispheric shell 60. In the illustrated embodiment of the invention, the scatter light sensor 58 is secured to the underside of the adapter plate 28 which, in turn, is removably mounted in the top wall 12 by suitable means such as threaded bolts 72 as shown in FIG. 4. Also to facilitate electrical connection of leads 74 extending from the sensor 58 with circuitry within the console 10, the leads 74 engage circuit terminals 76 fixed to the top wall 12 when the adapter plate 28 is mounted in place.

The sample port shutter 48 is provided as a safety precaution to prevent discharge of the output beam from the laser 44 through the sample port 30 as when no sample 70 is in place. As shown in FIG. 4, the shutter 48 is movable between a port opening position depicted in solid lines and a port closing position depicted in phantom lines. To enable such movement of the shutter in a manner so that the shutter mechanism presents a minimum obstruction to the passage of scatter light from the bottom of a sample on the sample port 30 to all portions of the interior reflective wall 62 on the hemispheric shell 60, the shutter is arranged for actuation by means, specifically a solenoid 78, secured to the top wall 12 of the console but outside of the Coblentz Sphere 46. To this end and as shown in FIG. 4, the shutter 48 is pivotably supported on an axis 80 affixed in the underside of the top wall 12 and biased to a closed position by a spring 82. Opening movement of the shutter 48 against the bias of spring 82 is effected by actuation of the solenoid 78 and its pulling force on an armature wire 84 extending from the solenoid through the shell 60 to the shutter 48.

As pointed out above, it is important to the use of the specular sensor 56 as a mirror for directing the specular beam to the alignment screen 34 that the sensor 56 have a planar reflective surface which presents a reasonably large target area to the specular beam. It is equally important that the scatter sensor 58 presents a large target area to the scatter light focused by the hemispheric reflective surface 62. In this latter respect, it is to be noted that the focusing ability of the Coblentz Sphere 46 is reduced by the off-axis location of the scatter light source, (i.e., the sample port 30) relative to the sensor 58. Also the optical quality of the reflective surface 62 is compromised by the molded shell 60.

As a result of these conditions, and as illustrated in FIG. 4, scatter light originating in a laser beam approximating 1 millimeter in diameter striking the sample surface, or an area represented essentially by the point 86 in FIG. 4, is diffused to a relatively large area 88 at the sensor 58. Thus, it is important to an accurate measurement of all light reflected from the sample by the hemispheric reflecting surface 62 that the area presented by the sensor 58 be at least as large as the area over which scatter light is focused. Also it is important to accurate measurement of total scatter light reflected from the sample that the sensor 58 does not, in itself, obstruct light passing from the sample to all parts of the hemispheric reflecting surface 62. The thin cell permits mounting of the cell close to the axis 68 in or on the underside of the adapter plate 28 while avoiding interference with either the sample 70 or the scattered light. In this respect, the relatively thin planar configuration of the sensor 58 allows it to lie very closely to the equatorial plane of the hemispheric surface 62 so as to present minimal obstruction to both the scatter light and to the sample 70; the latter permitting an unobstructed planar surface for the sample. Finally, both sensors 56 and 58 must respond equally to a given light intensity if the values $V_d$ and $r_S$ in the equation for surface roughness represent accurate values of specular and scatter light respectively.

In accordance with the present invention, the requirements of the sensors 56 and 58 are met by commercially available photovoltaic cells. Such cells are relatively inexpensive and readily available in a wide range of sizes of wafer-like rectangular configurations. In the apparatus of the present invention, it is preferred that the sensors 56 and 58 be silicon photovoltaic cells of rectangular configuration to provide a sensitive surface area of at least 10 mm by 10 mm or 100 square millimeters. This area is at least as large as the area 88 defined by scatter light focused at the equatorial plane of the hemispheric surface 62 when the radius R approximates 3½ inches. Such cells have a peak response to wavelengths of light approximating 7200 Å which is sufficiently close to the wavelength of a He-Ne laser (6320 Å) to optimize the response of the sensors 56 and 58 to the beam of the laser 44. The two sensors are matched very simply by a sampling and testing procedure. In other words, a plurality of the cells are measured to discern two cells which provide the same electrical energy output when exposed to the same intensity of light and those two cells are used in the same surface roughness measuring console.

The photovoltaic cells used for the sensors 56 and 58 develop electrical energy in amounts related to the intensity of light striking the sensitive surface areas of the respective cells. That electric energy is the scatter signal $V_d$ and the specular signal $r_S$ in the previously cited T.I.S. equation for surface roughness and may be represented either as voltage or amperage. In this respect, however, the response characteristics of the sensors 56 and 58 to variations of specular and scatter light intensities within the design range of the apparatus must be accounted for. Thus, in FIG. 5A, where the meter 32 is used as a voltmeter 32A, the leads from each sensor 56 and 58 are shunted by resistors 90 and 92, respectively. In practice, the resistors 90 and 92 are selected to have a resistance of approximating 2.7 Ohms. The resistors 90 and 92 have the effect of modifying the voltage response curve of the sensors 56 and 58 to a nearly linear curve in the range of anticipated specular and scatter intensities.

The amperage developed by the sensors 56 and 58, on the other hand, corresponds directly to variations in light intensity on an essentially linear basis. Also, the current output of the cells remains relatively stable with variations in temperature and other ambient conditions. It is preferred, therefore, that the meter 32 be used as ammeter 32B to provide the values $V_d$ and $r_S$ in the T.I.S. equation. Where the meter 32 operates as an ammeter, a resistor 93 is connected in series with the meter to provide the resistive load in the circuit. The value of the resistance 93 may very widely (i.e., from 3 to 220 Ohms) without noticeable effect in the performance of the meter 32b.

Because the electrical outputs of the sensors are measured directly by the meter 32, the meter must be adequately sensitive and accurate to register variations in sensor output which correspond to variations in specular and scatter light intensity. Extremely sensitive meters which satisfy these requirements are now available commercially. For example, excellent results have been obtained with a "Keithley—Model #197 Digital Multimeter." This meter is sensitive to 1 microvolt in a voltmeter mode and to 1 nanoampere in an ammeter mode. Other equivalent meters may be used.

Figure 5A:
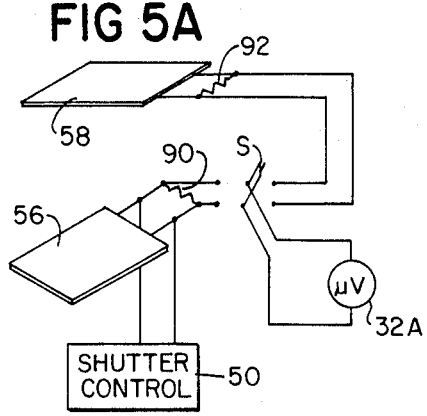
FIGS. 5A and 5B are circuit diagrams illustrating alternative circuits for electrical connection of sensor components used in the apparatus.
Figure 5B:
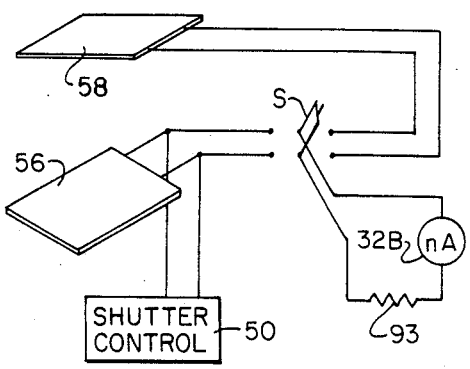

Also as shown in FIGS. 5A and 5B, the specular sensor 56 is connected electrically to the shutter control circuit 50 in a manner such that the shutter 48 will be held by the solenoid 78 to its open position (solid lines in FIG. 4) for so long as a specular beam is reflected from a sample 70 in place over the sample port 30. Thus, once activated by the computer 36 as later explained, the solenoid 78 will remain actuated by the shutter control circuit at all times during which the cell 56 is generating a voltage. The shutter control circuit, as shown in FIG. 2, may include a Schmidt trigger 94 set to respond to a voltage corresponding to the specular light reflected from the lowest reflective sample anticipated. The trigger activates a 6 volt power supply 96 which energizes the solenoid 78 to retract the shutter 48 from a closed position under the sample port 30 to its open position away from the sample port.

The switch S, as previously mentioned, is a double-pole, double-throw switch by which each of the sensors 56 and 58 may be connected to the meter 32 while a sample 70 is in place over the sample port 30. While it is contemplated that the output of the meter 32 may be supplied electrically to the computer 36, it is preferred that the energy output of each sensor be read and input manually to the computer 36 using the keyboard on the front wall of the console 10.

The computer 36 is also a commercial available computer, for example, a "Sharp PC-1500A." A computer of this type may be mounted in the console 10 and includes a permanent 4K memory as well as output ports for driving the printer 38 and for controlling the laser power supply unit 40. The permanent memory allows the computer to be programmed to compute surface roughness given only the voltage or amperage indicated by the meter 36 as well as to prompt operator input of various additional information such as sample identification data and the like. In addition, the computer programming is preferably designed so that a proper code input, such as operator identification, must be entered in order to enable the laser power supply unit 40. In this way, operation of the laser can be confined to designated personnel who have been properly trained. In the same manner, the computer 36 may be operated to develop an output for overriding the normal operation of the shutter control circuit.

The computer 36 and the programming thereof is also used to compensate for error factors resulting from compromise of optical and electro-optical precision. For example, in the use of the specular sensor 56 as a reflective surface to direct the specular beam to the alignment screen 34, electrical output of the sensor 56 is reduced relative to the output that would result from the same specular beam aligned at a right angle or normal to the plane of the sensor 56, the latter arrangement being required to measure the true intensity of specular light. Because the angle of incidence between the specular beam and the sensor 56 is fixed in a given console 10, and may be discerned, the response of the sensor 56 to a given normal beam relative to the response of the sensor 56 to the same beam at the angle of incidence used in the console 10 may be expressed as a constant in the equations programmed into the computer 36. The computer thus provides a means for calibrating the assembly of components mounted in a specific console 10.

In operation of the apparatus thus contained by the console 10, a sample is placed on the sample port 30 so that the surface of the sample to be measured for roughness is presented downwardly over the sample port 30. Assuming connection of a main power supply (not shown) a surface measuring and recording cycle is initiated through the computer by first energizing the solenoid 78 to retract the shutter 48 from the sample port 30. The laser unit 44 is then energized, again through the computer 36, to direct a probe beam of laser light to the reflector 52, through the aperture 66 and to the surface of the sample positioned over the sample port 30. Specular light reflected from the bottom surface sample will be reflected by the mirror 56 and sensor 56 to the screen 34 as a spot of light visible to the operator. At this stage of the operation, the operator will shim or otherwise reorient the sample overlying the sample port 30 until the beam of light reflected from the sensor 56 is centered on the screen 34.

With the sample properly centered or oriented so that the specular beam is located at the center of the screen 34, the switch S is adjusted to connect one of the two sensors 56 and 58 to the meter 32. The value indicated on the meter 32 is then entered into the computer 36 and the switch S reversed to connect the other of the two sensors 56 and 58 with the meter 32. The procedure is repeated so that both specular and scatter light readings are entered into the computer 36. Sample roughness is recorded by the printer 38 together with other information as desired through the computer 36. It will be noted that should the sample be removed from the sample port so that no specular light strikes the sensor 56, the shutter is automatically closed over the sample port to prevent the laser beam from passing through the port 30, all as a safety precaution.

Figure 6:
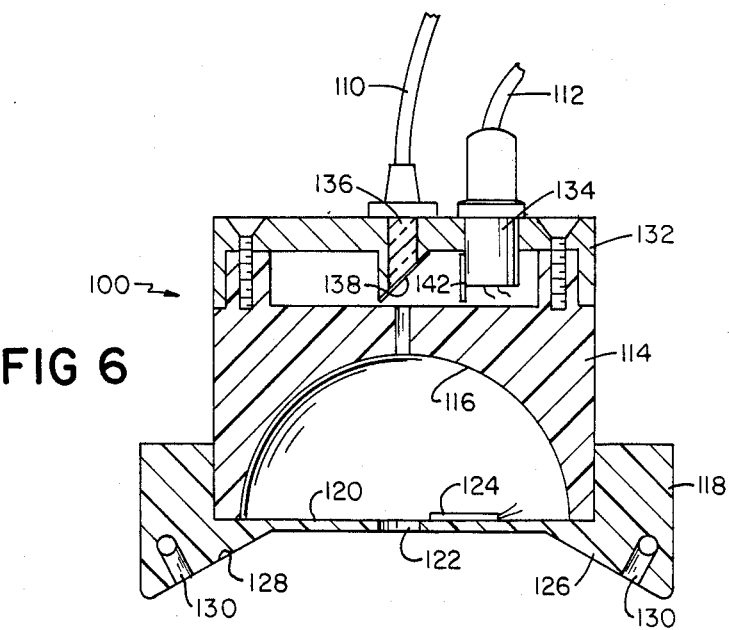
FIG. 6 is a cross section of a remote sensing head of the invention.
Figure 7:
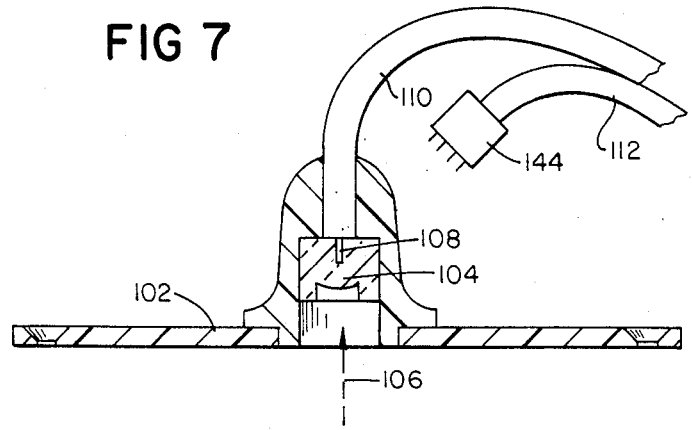
FIG. 7 is a similar cross section of an adapter plate by which the remote head of FIG. 6 may be used with the console illustrated in FIG. 1.

The console 10 may be adapted to measure the surface roughness of samples too large to be placed on the console 10 by use of a remote head 100 illustrated in FIG. 6 of the drawings. To connect the remote head 100 to the console 10, the adapter plate 28 is removed and, in its place, an adapter plate 102 (FIG. 7) is substituted. The plate 102 supports a lens 104 by which a laser beam 106 originating with the console mounted laser 44 is focused to the core 108 of an optical fiber 110. The optical fiber 110 extends with an electrical conduit 112 as a connecting cable to the remote head 100.

The construction of the head 100, as illustrated in FIG. 6, includes a body portion 114 in which a reflective hemispheric surface 116 is formed. The body portion 114 is supported in a mounting base 118 which defines a plate-like closure 120 at the equatorial plane of the hemisphere 116. The closure 120 is formed with a circular aperture or port 122 and supports a scatter sensor 124 immediately adjacent the port 122. The mounting base 118 is further defined with pedestal portions 126 and 128 which may be shaped to conform with a particular surface, in this instance a cylindrical surface as might be found on a calendaring roll, for example. Air ports 130 enable the pedestal 118 to be supported in spaced relationship to the surface being measured by air supplied to the ports 130 by a source of compressed air (not shown). Also in this respect, the base 18 is formed of teflon or other similar material to minimize damage to the surface to be measured as a result of mounting the head 100 thereon.

The body 114 is closed by a cap 132 which supports an electric terminal 134, a lens 136 and a beam splitting mirror 138. The lens 136 is aligned with an aperture 140 in the body 114 opening through the reflective surface 116. The terminal 134 supports a spectral sensor 142. Thus, light passing through the optical fiber 110 and the lens 136 is directed through the beam splitting mirror 138 to the sample surface positioned under the port 122. Specular light is reflected back to the beam splitting mirror 138 to the specular sensor 142. Scatter light is reflected by the surface 116 to the scatter sensor 124. The computer 36 is made responsive to connection to the remote head for switching the shutter control from the sensor 56 to the sensor 142. In all other respects, operation of the remote head 100 is the same as the operation described above with respect to a sample placed on the console 10. Electrical signals from the sensors 124 and 142 are fed to the meter 32 on the console 10 through the electrical conduit 112 which may be coupled directly to the console using a conventional four conductor plug 146.

Thus, it will be appreciated that as a result of the invention, a highly effective apparatus is provided for practicing the T.I.S. method of measuring surface roughness and by which the principal objective, among others, are completely fulfilled. It will also be apparent to those skilled in the art from the preceeding description and accompanying drawing illustrations that modifications may be made in the described and illustrated embodiment without departure from the invention. It is expressly intended therefore, that the foregoing disclosure be illustrative only, not limiting, and that the true spirit and scope of the present invention be determined by reference to the appended claims.

What is claimed is:

1. Apparatus for measuring roughness of a sample surface, said apparatus comprising:
   means defining an interior hemispheric reflecting surface opening at an equatorial plane and concentric with a polar axis perpendicular to said plane, said reflective surface having an aperture near the intersection of said reflecting surface and said polar axis;
   means for positioning the sample surface and said reflecting surface so that the sample surface lies near said equatorial plane;
   means for directing a beam of light through said aperture to the sample surface so that specular light reflected from the sample surface passes back through said aperture;
   a specular sensor positioned outside of said hemispheric reflecting surface for providing a signal corresponding to the intensity of specular light reflected from the sample surface; and
   a scatter sensor for providing a signal corresponding to the intensity of scatter light reflected from the sample surface and focused by said interior hemispheric reflecting surface at said equatorial plane, said scatter sensor comprising a wafer-thin light responsive cell having a light sensitive area approximating the area defined by scatter light focused by said hemispheric reflecting surface at said equatorial plane.

2. The apparatus recited in claim 1, wherein said scatter sensor comprises a photovoltaic cell having a sensitive service area of at least 100 square millimeters.

3. The apparatus recited in claim 2, wherein the radius of said hemispheric reflecting surface approximates $3\frac{1}{2}$ inches.

4. The apparatus recited in claim 1, wherein said specular sensor comprises a light responsive cell having the same physical and light responsive characteristics as said scatter sensor.

5. The apparatus recited in claim 1, wherein said specular sensor comprises a light responsive cell having a planar reflective surface on the light responsive area thereof.

6. The apparatus recited in claim 5, including a sample surface alignment screen to which specular light reflected from said planar reflective surface is directed.

7. The apparatus recited in claim 1, wherein said means for positioning the sample surface and said hemispheric reflecting surface comprises a generally horizontal wall, means for supporting said hemispheric reflecting surface under said horizontal wall, and means defining a sample port in said horizontal wall so that said beam of light passing through said aperture in said reflecting surface passes through said sample port to a sample supported on top of said horizontal wall.

8. The apparatus recited in claim 7, wherein the top surface of said horizontal wall lies substantially in said equatorial plane.

9. The apparatus recited in claim 7, wherein said scatter sensor is secured under said horizontal wall adjacent to said sample port.

10. The apparatus recited in claim 7, including a shutter mounted under said horizontal wall and displaceable between a first position removed from said sample port and a second position in blocking relation to said sample port, and means responsive to reception of light greater than a given value by said specular sensor for maintaining said shutter in said first position and responsive to reception of light less than said given value for displacing said shutter to its said second position to block light from passing through said port when the sample is removed.

11. The apparatus recited in claim 7 wherein said top wall includes a removable plate, said sample port is located in said plate, and said scatter sensor is mounted on the interior surface of said plate.

12. The apparatus recited in claim 1, wherein said means for positioning the sample surface and said hemispheric reflecting surface comprises a mounting base for supporting said hemispheric reflecting surface defining means, said base being mountable on the sample surface.

13. The apparatus recited in claim 12, wherein said mounting base is of a material having the characteristics of Teflon.

14. The apparatus recited in claim 12, wherein said mounting base includes air ports to support said base from the sample surface on a cushion of air.

15. Apparatus for measuring roughness of a sample surface, said apparatus comprising:
- a console having top and front walls, said top wall having a sample port therein;
- a hemispheric shell having a totally reflective internal surface and supported under said top wall and said sample port and so that the top surface of said top wall lies substantially in the equatorial plane of said hemispheric shell, said shell having an aperture therein displaced from the polar axis thereof;
- a laser and laser power supply mounted within said console for directing a probe beam of light through said aperture and said sample port;
- a specular sensor positioned within said console and outside of said hemispheric reflecting surface for providing a signal corresponding to the intensity of specular light reflected from the sample surface;
- a scatter sensor for providing a signal corresponding to the intensity of scatter light reflected from the sample surface and focused by said interior hemispheric reflecting surface at said equatorial plane, said scatter sensor being mounted adjacent said sample port under said top wall; and
- metering means for quantifying the respective strengths of said signals.

16. The apparatus recited in claim 15, comprising a sample alignment screen in a wall of said console and means including said specular sensor for directing specular light reflected from the sample surface as a beam of light to intersect said screen as a visible alignment spot.

17. The apparatus recited in claim 15, including computer means for controlling said laser power supply and for calculating surface roughness as a function of the respective strengths of said signals.

18. The apparatus recited in claim 15, including shutter means under said top wall for blocking said sample port in the absence of a sample covering said sample port.

19. The apparatus recited in claim 18, further comprising means including said specular sensor for operating said shutter.

20. The apparatus recited in claim 15, wherein said sample port is defined by an adapter plate removably secured in said top wall.

21. The apparatus recited in claim 20, including a remote sensing head having a separate hemispheric reflective surface, a separate specular sensor and a separate scatter sensor, and means including a substitute adapter plate for connecting said remote sensing head to said console.

22. The apparatus recited in claim 21, including fiber optical means for transmitting said probe beam of light from said console to said remote sensing head.

23. The apparatus recited in claim 22, including electrical means for transmitting signals from said separate sensors to said console and said meter.

* * * * *